(12) United States Patent
Kawi et al.

(10) Patent No.: US 12,715,767 B2
(45) Date of Patent: Aug. 25, 2026

(54) PALLADIUM-BASED MEMBRANE

(71) Applicant: National University of Singapore, Singapore (SG)

(72) Inventors: Sibudjing Kawi, Singapore (SG); Subhasis Pati, Singapore (SG); Nikita Dewangan, Singapore (SG); Ashok Jangam, Singapore (SG); Zhigang Wang, Singapore (SG)

(73) Assignee: National University of Singapore, Singapore (SG)

( * ) Notice: Subject to any disclaimer, the term of this patent is extended or adjusted under 35 U.S.C. 154(b) by 840 days.

(21) Appl. No.: 17/913,198

(22) PCT Filed: Mar. 23, 2021

(86) PCT No.: PCT/SG2021/050157

§ 371 (c)(1),
(2) Date: Sep. 21, 2022

(87) PCT Pub. No.: WO2021/194417

PCT Pub. Date: Sep. 30, 2021

(65) Prior Publication Data

US 2023/0128487 A1 Apr. 27, 2023

(30) Foreign Application Priority Data

Mar. 23, 2020 (SG) ........................... 10202002674Y

(51) Int. Cl.
*C01B 3/505* (2026.01)
*B01D 67/00* (2006.01)
(Continued)

(52) U.S. Cl.
CPC .......... *C01B 3/505* (2013.01); *B01D 67/0051* (2013.01); *B01D 67/0069* (2013.01);
(Continued)

(58) Field of Classification Search
CPC .. B01D 67/0051; B01D 69/02; B01D 69/081; B01D 69/108; B01D 69/12;
(Continued)

(56) References Cited

U.S. PATENT DOCUMENTS 8,518,151 B2 * 8/2013 Tessier ............. B01D 71/02231 95/55
2004/0237779 A1 * 12/2004 Ma ..................... B01D 67/0072 95/55

(Continued)

FOREIGN PATENT DOCUMENTS

| | | |
|---|---|---|
| CN | 101274223 | 10/2008 |
| CN | 105013339 | 11/2015 |
| ES | 2327597 | 10/2009 |

OTHER PUBLICATIONS

Inokawa ("Catalysis of nickel nanoparticles with high thermal stability for ammonia decomposition", Applied Catalysis A: General, vol. 391, pp. 184-188. 2015) (Year: 2015).*

(Continued)

*Primary Examiner* — Anthony J Zimmer
*Assistant Examiner* — Jaanzeb C Raja
(74) *Attorney, Agent, or Firm* — Dority & Manning, P.A.

(57) ABSTRACT

There is provided a membrane comprising: a porous support layer having a first surface and a second surface; a palladium (Pd)-based selective layer on a first surface of the support layer; and a zeolite protective layer on a second surface of the support layer, wherein the support layer is between the Pd-based selective layer and the zeolite protective layer. There is also provided a method of forming the same.

12 Claims, 14 Drawing Sheets

(51) Int. Cl.

| | |
|---|---|
| ***B01D 69/02*** | (2006.01) |
| ***B01D 69/08*** | (2006.01) |
| ***B01D 69/10*** | (2006.01) |
| ***B01D 69/12*** | (2006.01) |
| ***B01D 71/02*** | (2006.01) |
| ***B01J 19/24*** | (2006.01) |
| ***B01J 23/755*** | (2006.01) |

(52) U.S. Cl.

CPC ........... *B01D 69/02* (2013.01); *B01D 69/081* (2013.01); *B01D 69/108* (2022.08); *B01D 69/12* (2013.01); *B01D 69/1216* (2022.08); *B01D 71/0223* (2022.08); *B01D 71/02231* (2022.08); *B01D 71/0281* (2022.08); *B01J 19/2475* (2013.01); *B01J 23/755* (2013.01); *B01D 2325/02833* (2022.08); *B01D 2325/04* (2013.01); *B01D 2325/10* (2013.01); *C01B 2203/0277* (2013.01); *C01B 2203/041* (2013.01); *C01B 2203/1058* (2013.01); *C01B 2203/1235* (2013.01)

(58) Field of Classification Search

CPC ............ B01D 69/1216; B01D 71/0223; B01D 71/02231; B01D 71/0281; B01D 2325/02833; B01D 2325/10; B01D 69/08; B01J 19/2475; B01J 23/755; C01B 2203/0277; C01B 2203/041; C01B 2203/1058; C01B 2203/1235; C01B 2203/0233; C01B 220/0238; Y02P 20/141; Y02P 20/52

See application file for complete search history.

(56) References Cited

U.S. PATENT DOCUMENTS

| | | | | |
|---|---|---|---|---|
| 2004/0251201 A1* | 12/2004 | Chau | B01D 67/0086 210/500.21 |
| 2015/0298102 A1 | 10/2015 | Kawi et al. | |

OTHER PUBLICATIONS

International Preliminary Report on Patentability for corresponding PCT Application No. PCT/SG2021/050157, mailed on Oct. 6, 2022, 8 pages.

PCT International Search Report and Written Opinion for corresponding PCT Application No. PCT/SG2021/050157, mailed on May 4, 2021, 10 pages.

Pati et al., "Nanoporous Zeolite-A Sheltered Pd-Hollow Fiber Catalytic Membrane Reactor for Propane Dehydrogenation," *ACS Appl. Nano Mater.*, Jun. 15, 2020, vol. 3, No. 7, pp. 6675-6683.

* cited by examiner $H_2$
Catalyst-PDH
Nano-porous Zeolite
$Al_2O_3$
$H_2$
Pd-Membrane
$CO_2$ $CH_4$ (a)

(b)

PALLADIUM-BASED MEMBRANE

CROSS-REFERENCE TO RELATED APPLICATIONS

This application is a national phase application of International Patent Application No. PCT/SG2021/050157, filed Mar. 23, 2021, which, in turn, claims the priority of Singaporean patent application number 10202002674Y, filed Mar. 23, 2020, both of which are hereby incorporated herein by reference in their entirety.

TECHNICAL FIELD

The present invention relates to a palladium-based membrane and a method of forming the same.

BACKGROUND

Lighter alkenes are the important building blocks of an enormous range of chemicals and polymers in different industries. Propene is one of the major lighter alkenes which is used for production of poly-propene, acrylonitrile etc. Conventional steam cracking of higher hydrocarbons, such as naphtha and other by-products of oil industry is the widespread means for producing propylene. Catalytic propane dehydrogenation is one of the major technique for production of propene on a larger scale. The reaction is highly endothermic and requires a high temperature. Mostly, the catalytic conversion of the reaction is equilibrium controlled and thus, the removal of either propene or hydrogen during the reaction could increase the conversion of the reaction. Therefore, hydrogen permeable membranes such as palladium (Pd) membranes have been used for lighter alkane dehydrogenation processes to simultaneously and selectively remove the in situ produced hydrogen from the reaction.

However, Pd membranes are not very stable in the presence of contaminating gases like hydrocarbons. Particularly in the presence of unsaturated hydrocarbons like propene, hydrogen permeation flux decreases drastically in the Pd membranes. The hydrocarbon species gets absorbed on the surface of Pd membrane and the membrane surface gets contaminated with deposited carbon. This blocks the active sites for dissociative chemisorption of hydrogen and accordingly, decreases the hydrogen permeation flux.

To overcome this, zeolite covered Pd membranes have been used in which a zeolite layer with uniform pore size is formed directly on the Pd layer on the membrane surface so as to restrict the hydrocarbons and improve membrane stability. However, due to increased mass transfer resistance and covering of zeolite over Pd layer on the membrane surface, there is a drastic reduction in hydrogen permeation loss as compared to a bare Pd membrane.

Thus, there is a need for an improved Pd-based membrane.

SUMMARY OF THE INVENTION

The present invention seeks to address these problems, and/or to provide an improved Pd-based membrane.

According to a first aspect, the present invention provides a membrane comprising:

- a porous support layer having a first surface and a second surface;
- a palladium (Pd)-based selective layer on a first surface of the support layer; and

- a zeolite protective layer on a second surface of the support layer, wherein the support layer is between the Pd-based selective layer and the zeolite protective layer.

The membrane may be suitable for use in hydrogenation/dehydrogenation reaction or reforming reactions.

The porous support layer may be any suitable support layer. According to a particular aspect, the support layer may comprise a ceramic material. The ceramic material may be any suitable ceramic material, comprising, but not limited to: alumina, titania, zirconia, yttria, ceria, or a combination thereof. In particular, the support layer may comprise alumina.

The porous support layer may comprise pores. According to a particular aspect, the support layer may comprise pores each having an average pore size of 50-200 nm.

The support layer may be in any suitable form. For example, the support layer may be, but not limited to, a hollow fibre support layer, a tubular support layer, or a disc.

According to a particular aspect, the support layer may be a hollow fibre support layer having an inner circumferential surface and an outer circumferential surface and wherein the palladium (Pd)-based selective layer is provided on the inner circumferential surface and the zeolite protective layer is provided on the outer circumferential surface. The hollow fibre support layer may have a suitable outer diameter. For example, the outer diameter of the support layer may be 800-4000 μm. The hollow fibre support layer may have a suitable inner diameter. For example, the inner diameter of the support layer may be 500-2000 μm.

The Pd-based selective layer may be any suitable Pd-comprising selective layer. According to a particular aspect, the selective layer may comprise palladium or a palladium alloy. For example, the palladium alloy may be, but is not limited to, palladium-silver alloy, palladium-silver-copper alloy, palladium-silver-cobalt alloy, palladium-copper alloy, palladium-nickel alloy, palladium-gold alloy, palladium-gold-cobalt alloy, palladium-gold-iridium alloy, palladium-gold-rhodium alloy, palladium-ruthenium alloy, or a combination thereof.

The Pd-based selective layer may have a suitable thickness. For example, the Pd-based selective layer may have a thickness of 0.5-5.0 μm.

The zeolite protective layer may be any suitable zeolite-comprising layer. According to a particular aspect, the zeolite protective layer comprises aluminosilicate zeolite. For example, the aluminosilicate zeolite may be, but not limited to, Linde type A (LTA) zeolite, H-sodalite (H-SOD) zeolite, titanium silicalite-1 zeolite, zeolite Socony Mobil-5 (ZSM-5), or a combination thereof.

The zeolite protective layer may have a suitable thickness. For example, the zeolite protective layer may have a thickness of 0.5-3.0 μm.

According to a particular aspect, the membrane may further comprise a catalyst layer on the zeolite protective layer. The catalyst layer may comprise metal nanoparticles. In particular, the catalyst may comprise Ni-based nanoparticles.

According to a second aspect, there is provided a method of preparing a membrane, the method comprising:

- forming a palladium (Pd)-based selective layer on a first surface of a porous support layer; and
- forming a zeolite protective layer on a second surface of the porous support layer, wherein the porous support layer is between the Pd-based selective layer and the zeolite protective layer.

According to a particular aspect, the forming a Pd-based selective layer may comprise forming the Pd-based selective layer by any suitable method. For example, the forming a Pd-based selective layer may comprise, but is not limited to, electroless plating the Pd-based selective layer on the first surface of the support layer.

The Pd-based selective layer may be any suitable Pd-based selective layer. According to a particular aspect, the Pd-based selective layer may be a Pd-based selective layer as described above in relation to the first aspect.

The forming a zeolite protective layer may comprise forming the zeolite protective layer by any suitable method. For example, the forming a zeolite protective layer may comprise, but is not limited to, coating the zeolite protective layer on the second surface of the support layer by secondary growth hydrothermal method.

The zeolite protective layer may be any suitable zeolite layer. According to a particular aspect, the zeolite protective layer may be a zeolite protective layer as described above in relation to the first aspect.

The method may further comprise forming a support layer prior to the forming a Pd-based selective layer. The forming a support layer may be by any suitable method. For example, the forming a support layer may comprise, but is not limited to, forming the support layer by phase inversion.

The porous support layer may be any suitable support layer. According to a particular aspect, the porous support layer may be a support layer as described above in relation to the first aspect.

The method may further comprise forming a catalyst layer on the zeolite protective layer. The catalyst layer may be formed by any suitable method. For example, the catalyst layer may be formed by hydrothermal synthesis.

The catalyst layer may be any suitable catalyst layer. According to a particular aspect, the catalyst layer may be a catalyst layer as described above in relation to the first aspect.

BRIEF DESCRIPTION OF THE DRAWINGS

In order that the invention may be fully understood and readily put into practical effect there shall now be described by way of non-limitative example only exemplary embodiments, the description being with reference to the accompanying illustrative drawings. In the drawings.

DETAILED DESCRIPTION

Figure 1:
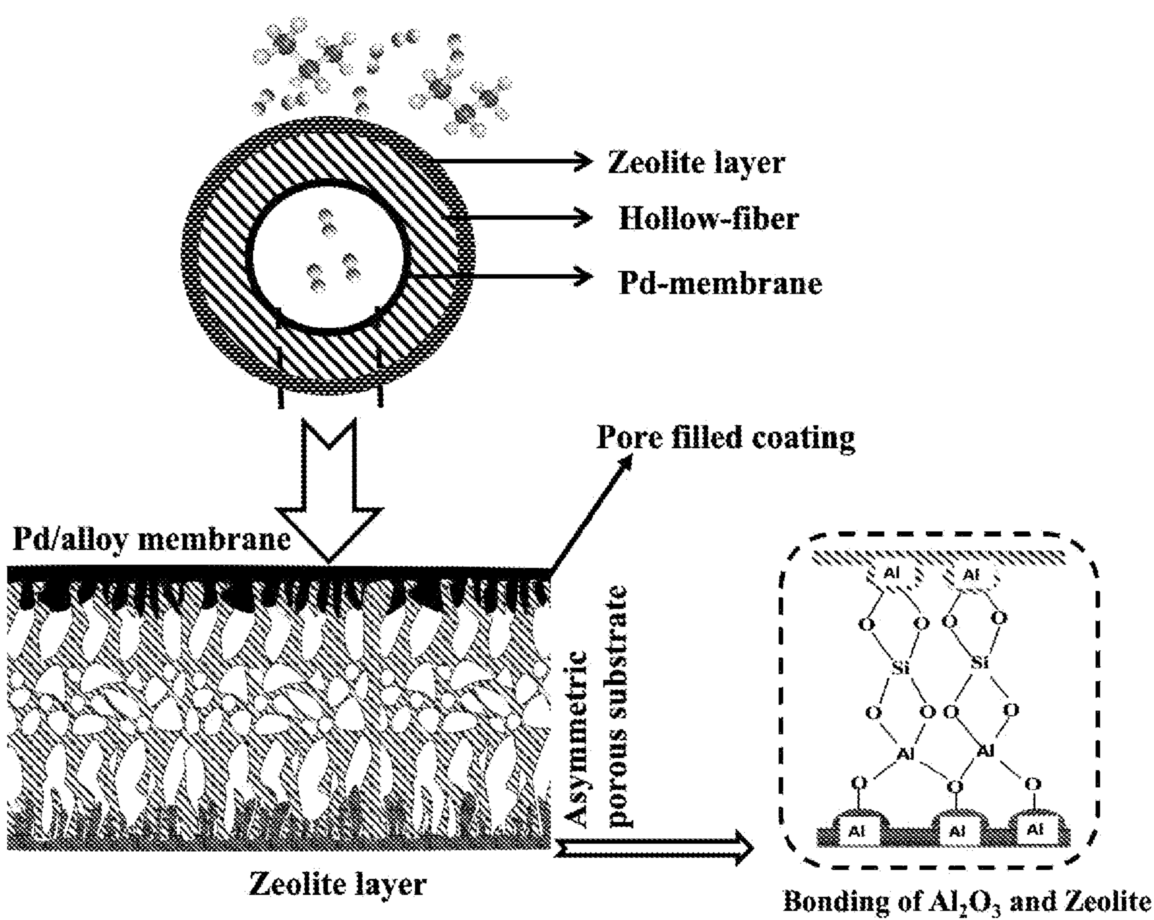
FIG. 1 shows a schematic representation of a membrane according to one embodiment of the present invention.

As explained above, there is a need for an improved palladium (Pd)-based membrane, particularly one which can be used for effective separation of hydrogen from different feed stocks.

In general terms, the present invention provides a triple layered membrane. The membrane may comprise a support layer with a homogeneous layer of zeolite and a palladium-based material on either side of the support layer. The membrane of the present invention may comprise improved thermal and chemical stability. In particular, the membrane may improve the poisoning of Pd-based membranes in the presence of hydrocarbons and other coke forming agents, particularly when used in hydrogen recovery applications.

According to a first aspect, the present invention provides a membrane comprising:

- a porous support layer having a first surface and a second surface;
- a palladium (Pd)-based selective layer on a first surface of the support layer; and
- a zeolite protective layer on a second surface of the support layer, wherein the support layer is between the Pd-based selective layer and the zeolite protective layer.

The membrane may be suitable for use in any suitable application. For example, the membrane may be used in hydrogenation/dehydrogenation reactions or reforming reactions such as, but not limited to, hydrocarbon reforming reactions. Other suitable applications include, but not limited to, propane dehydrogenation, carbon dioxide hydrogenation, hydrocarbon reforming for hydrogen production and carbon dioxide reforming of methane. In particular, the coke resistant properties of the membrane enable its use in dehydrogenation reactions. The membrane comprising the zeolite protective layer enables the membrane to effectively recover hydrogen during dehydrogenation reactions, thereby surpassing the thermodynamic limitations and moving the equilibrium towards more product formation.

The membrane according to the present invention, by comprising a Pd-based selective layer and a zeolite protective layer on either side of a support layer enables the selective layer and the protective layer to homogeneously and strongly adhere to the surface of the support layer.

The porous support layer may be any suitable support layer. The support layer may comprise any suitable material. For example, the support layer may comprise an inorganic material. The inorganic material may be, but not limited to, alumina, alumina-YSZ, ceramic, stainless steel, vycor glass, or a combination thereof. According to a particular aspect, the support layer may comprise a ceramic material. The ceramic material may be any suitable ceramic material, comprising, but not limited to: alumina, titania, zirconia, yttria, ceria, or a combination thereof. In particular, the support layer may comprise alumina.

The porous support layer may comprise pores having a suitable pore size. According to a particular aspect, the support layer may comprise pores having an average pore size of 50-200 nm. In particular, the support layer may comprise pores having an average pore size of 75-175 nm, 100-150 nm, 110-125 nm. Even more in particular, the average pore size may be about 50 nm.

The support layer may be in any suitable form and shape. For example, the support layer may be, but not limited to, a hollow fibre support layer, a tubular support layer, or a disc. According to a particular aspect, the support layer may be a hollow fibre support layer.

According to a particular aspect, the support layer may be a hollow fibre support layer having an inner circumferential surface and an outer circumferential surface and wherein the palladium (Pd)-based selective layer is provided on the inner circumferential surface and the zeolite protective layer is provided on the outer circumferential surface.

The hollow fibre support layer may have a suitable outer diameter. For example, the outer diameter of the support layer may be 800-4000 μm. In particular, the outer diameter may be 1000-3800 μm, 1200-3500 μm, 1500-3300 μm, 1800-3000 μm, 2000-2800 μm, 2200-2500 μm. Even more in particular, the outer diameter may be about 1800 μm.

The hollow fibre support layer may have a suitable inner diameter. For example, the inner diameter of the support layer may be 500-2000 μm. In particular, the inner diameter may be 750-1750 μm, 900-1500 μm, 1000-1400 μm, 1100-1300 μm, 1200-1250 μm. Even more in particular, the inner diameter may be about 1400 μm.

The Pd-based selective layer may be any suitable Pd-comprising selective layer. The Pd-based selective layer may comprise palladium in any suitable form. For example, the Pd-based selective layer may comprise palladium or a palladium alloy. According to a particular aspect, the palladium alloy may be, but is not limited to, palladium-silver alloy, palladium-silver-copper alloy, palladium-silver-cobalt alloy, palladium-copper alloy, palladium-nickel alloy, palladium-gold alloy, palladium-gold-cobalt alloy, palladium-gold-iridium alloy, palladium-gold-rhodium alloy, palladium-ruthenium alloy, or a combination thereof.

The Pd-based selective layer may have a suitable thickness. For example, the Pd-based selective layer may have a thickness of 0.5-5.0 μm. In particular, the thickness of the Pd-based selective layer may be 0.7-4.8 μm, 0.8-4.5 μm, 1.0-4.3 μm, 1.2-4.0 μm, 1.5-3.8 μm, 1.7-3.5 μm, 2.0-3.2 μm, 2.2-3.0 μm, 2.5-2.8 μm. Even more in particular, the thickness may be about 1.0 μm.

The zeolite protective layer may be any suitable zeolite-comprising layer. The zeolite protective layer may comprise any suitable zeolite. According to a particular aspect, the zeolite protective layer may comprise an aluminosilicate zeolite. For example, the zeolite protective layer may comprise, but is not limited to, Linde type A (LTA) zeolite, H-sodalite (H-SOD) zeolite, titanium silicalite-1 zeolite, zeolite Socony Mobil-5 (ZSM-5), or a combination thereof.

The zeolite protective layer may have a suitable thickness. For example, the zeolite protective layer may have a thickness of 0.5-3.0 μm. In particular, the thickness may be 0.7-2.8 μm, 0.8-2.5 μm, 1.0-2.3 μm, 1.2-2.0 μm, 1.5-1.8 μm. Even more in particular, the thickness may be about 1.0 μm.

The zeolite protective layer may be functionalised. For example, the zeolite protective layer may be functionalised in any suitable manner. In particular, the zeolite protective layer may be functionalised by catalytic material. Even more in particular, the zeolite protective layer may be functionalised by active metals by forming phyllosilicate structures.

Accordingly, the membrane may further comprise a catalyst layer on the zeolite protective layer. The catalyst layer may provide active catalytic centres when the membrane is in use, such as in use during pyrolysis reactions. The catalyst layer may be any suitable catalyst layer. For example, the catalyst layer may comprise metal nanoparticles. In particular, the catalyst may comprise Ni-based nanoparticles. Even more in particular, the Ni-based nanoparticles may comprise, but not limited to, Ni—Cu, Ni—Co, Ni—Pt, or a combination thereof. The zeolite protective layer and the catalyst layer form a modified zeolite protective layer. The modified zeolite protective layer acts as both a catalyst when the membrane is used in hydrogenation/dehydrogenation and reforming reactions and as a protective layer for the membrane. Accordingly, in use, the membrane enables catalyses of the reactions, increase in hydrogen flux through the membrane by inhibiting coke formation on the membrane and at the same time, increase yield of the reaction by selectively removing hydrogen.

According to a particular embodiment, there is provided a hollow fibre membrane comprising: a porous hollow fibre support layer; a Pd-based selective layer on an inner circumferential surface of the hollow fibre support layer; and a zeolite protective layer on an outer circumferential surface of the hollow fibre support layer. In particular, providing a zeolite protective layer on the outer side of the hollow fibre membrane provides the membrane with an prolonged life due to reduction in coke deposition when the membrane is used in dehydrogenation reactions. A schematic representation of one embodiment of a hollow fibre membrane according to the present invention is as shown in FIG. 1.

The present invention also provides a method of forming a Pd-based membrane. According to a second aspect, there is provided a method of preparing a Pd-based membrane, the method comprising:

- forming a palladium (Pd)-based selective layer on a first surface of a porous support layer; and
- forming a zeolite protective layer on a second surface of the porous support layer, wherein the porous support layer is between the Pd-based selective layer and the zeolite protective layer.

The porous support layer may be any suitable porous support layer. According to a particular aspect, the support layer may be a support layer as described above in relation to the first aspect.

The Pd-based selective layer may be any suitable Pd-based selective layer. According to a particular aspect, the Pd-based selective layer may be a Pd-based selective layer as described above in relation to the first aspect.

The forming a Pd-based selective layer on a first surface of a porous support layer may be by any suitable method. For example, the forming may comprise, but is not limited to, electroless plating the Pd-based selective layer on the first surface of the support layer.

The zeolite protective layer may be any suitable zeolite layer. According to a particular aspect, the zeolite protective layer may be a zeolite protective layer as described above in relation to the first aspect.

The forming a zeolite protective layer on a second surface of the porous support layer may comprise forming the zeolite protective layer by any suitable method. For example, the forming a zeolite protective layer may comprise, but is not limited to, coating the zeolite protective layer on the second surface of the support layer. In particular, the coating may be by secondary growth hydrothermal method.

The method may further comprise forming a support layer prior to the forming a Pd-based selective layer. The forming a support layer may be by any suitable method. For example, the forming a support layer may comprise, but is not limited to, phase inversion.

The method may further comprise forming a catalyst layer on the zeolite protective layer following the forming a zeolite protective layer on a second surface of the porous support layer. The catalyst layer may be formed by any suitable method. For example, the catalyst layer may be formed by hydrothermal synthesis.

The catalyst layer may be any suitable catalyst layer. According to a particular aspect, the catalyst layer may be a catalyst layer as described above in relation to the first aspect.

Having now generally described the invention, the same will be more readily understood through reference to the following example which is provided by way of illustration, and is not intended to be limiting.

EXAMPLES

Example 1

Preparation of Membranes

Three different Pd-based membranes were formed. In particular, the three zeolite protected Pd-based membranes were named: M1 (LTA outside, Pd inside of $Al_2O_3$ hollow fibre); M2 (H-SOD outside, Pd inside of $Al_2O_3$ hollow fibre); and M3 (TS-1 outside, Pd inside of $Al_2O_3$ hollow fibre).

The alumina substrate surface had asymmetric pores on both side of the substrate for better adherence and homogeneity in coating the zeolites and the Pd layer.

Additionally, another membrane, membrane M4, was also prepared using conventional method for providing a basis of comparison. Membrane M4 was an unprotected Pd-based membrane.

The alumina hollow fibre substrate had the following dimensions: 200 mm length, 2 mm outer diameter (OD), 1.6 mm inner diameter (ID), 100 nm average pore size. The detailed experimental procedure for membrane preparation is given below. The α-alumina hollow-fibre used was synthesized by phase inversion method. The calcined hollow fibres were thoroughly cleaned in 1 M nitric acid ($HNO_3$) for 4 hours followed by washing in DI water.

Two different layers were deposited on either side of the α-alumina hollow-fibre substrate using different techniques. The inner circumferential surface was coated with a Pd layer using electroless plating method and the outer circumferential layer was coated with a zeolite layer using a secondary growth hydrothermal technique.

Prior to electroless deposition, the substrate inner surface was seeded by two-step sensitization/activation process. The process was carried out using acidic solution of $SnCl_2$ (3.7 g/L) and $PdCl_2$ (0.88 g/L) solution. The outer surface of the substrate was protected using Teflon and the two solutions were flown inside the tube using a peristaltic pump (Masterflex® L/S® Digital drive). The process was repeated for 10 times and the substrate was cleaned with DI water followed by oven drying.

(i) Pd-Based Selective Layer Formation

The activated substrate was then subjected to electroless deposition using hydrazine based plating baths. The plating solution was prepared by dissolving 0.2 g of $PdCl_2$ into 18 ml $NH_4OH$ in 82 ml water under ultrasonic condition, further 3.8 g of $Na_2EDTA$ was added to this and stirred for 30 min until a clear solution appeared. The solution was preheated to 60° C. in a water bath and recirculated inside the activated hollow fibre substrate. Hydrazine was added batch wise to the plating solution and the pH was also adjusted with time adding drops of $NH_4OH$. After Pd deposition the membrane was cleaned in DI water until the pH became about 7 and dried at 100° C. overnight.

(ii) Zeolite Protective Layer Formation

The zeolite layer was coated using secondary growth method, where, the outer layer of the substrate was seeded with zeolite seeds and the layer was then grown under hydrothermal treatment.

For membrane M1, LTA-zeolite was coated on the outer surface of inner coated Pd-membrane after capping both ends with Teflon. The zeolite membrane/seeds were deposited using a synthesis solution in a molar ratio of 50 $Na_2O$:1 $Al_2O_3$:5 $H_2O$:1000 $H_2O$. 22.22 μm of NaOH was added to 100 ml of water followed by dissolving 1.147 g of sodium aluminate ($NaAlO_2$) and the solution was stirred for 30 min for complete dissolution. 4.825 ml of sodium silicate solution was added drop wise to the aluminate solution under vigorous stirring conditions. The solution was stirred for 4 hours to form a transparent gel. For the seed preparation, the gel was put inside a Teflon liner inside a stainless steel autoclave and hydrothermal treatment was carried out for 24 hours at 60° C. The formed LTA zeolite was collected by centrifuge method, and particle size above 200 μm size was sieved out. Zeolite particles of ≤200 μm size were used as the seed. The cleaned substrate was seeded by dip coating method using 10 wt % zeolite water suspension. The process was repeated for 4-5 times with intermediate drying at 373 K for 1 hour. Finally, the seeded substrate was put inside an autoclave containing freshly prepared gel of similar composition as mentioned above and treated under hydrothermal at 60° C. for 24 hours.

The membrane was then taken out and cleaned thoroughly with deionized water several times to remove any unreacted base or silica residue. The membrane was finally dried overnight at 100° C. and used for hydrogen purification experiments.

For the preparation of membranes M2 and M3, a similar approach as was used for membrane M1 was used but under different experimental conditions.

For membrane M2, for the H-SOD deposition, the gel composition was similar to that of LTA in membrane M1 (50 $Na_2O$:1 $Al_2O_3$:5 $H_2O$:1000 $H_2O$), but the hydrothermal temperature was 140° C. for 4 hours.

For the preparation of membrane M3, for the TS-1 zeolite deposition, the gel composition was 1TEOS:0.01 TBOT: 0.18 TPAOH:250 $H_2O$ and the hydrothermal temperature was 160° C. for 24 hours.

Characterization of Membranes

The morphology of the membranes were characterized by scanning electron microscope (SEM) using SEM, JEOL2872. The formation of zeolite and zeolite membrane was characterized by X-ray diffraction analysis using a Rigaku XRD equipped with Cu—K(α) radiation source operated at 40 kV and 30 mA current.

Figure 2:
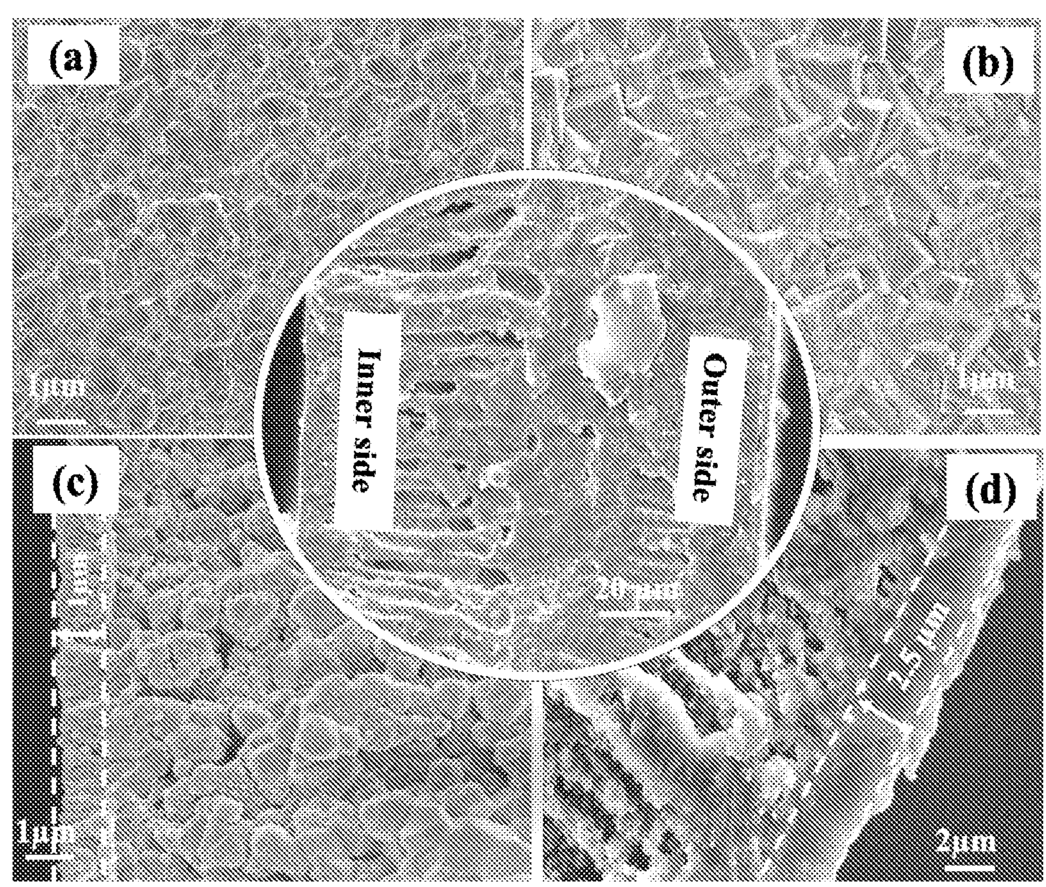
FIG. 2(*a*) shows SEM image of surface of Pd-based selective layer of membrane M1, FIG. 2(*b*) shows SEM image of surface of zeolite protective layer of membrane M1, FIG. 2(*c*) shows SEM image of cross-section of Pd-based selective layer of membrane M1, and FIG. 2(*d*) shows SEM image of cross-section of zeolite protective layer of membrane M1.
Figure 3:
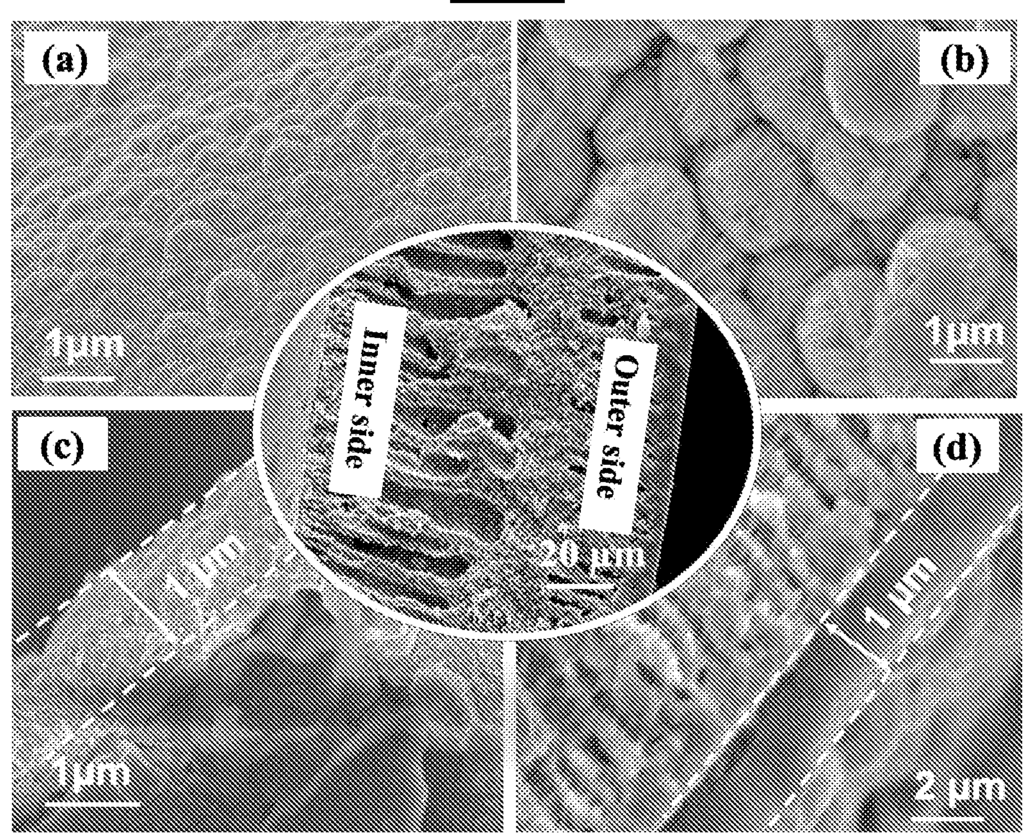
FIG. 3(*a*) shows SEM image of surface of Pd-based selective layer of membrane M2, FIG. 3(*b*) shows SEM image of surface of zeolite protective layer of membrane M2, FIG. 3(*c*) shows SEM image of cross-section of Pd-based selective layer of membrane M2, and FIG. 3(*d*) shows SEM image of cross-section of zeolite protective layer of membrane M2.
Figure 4:
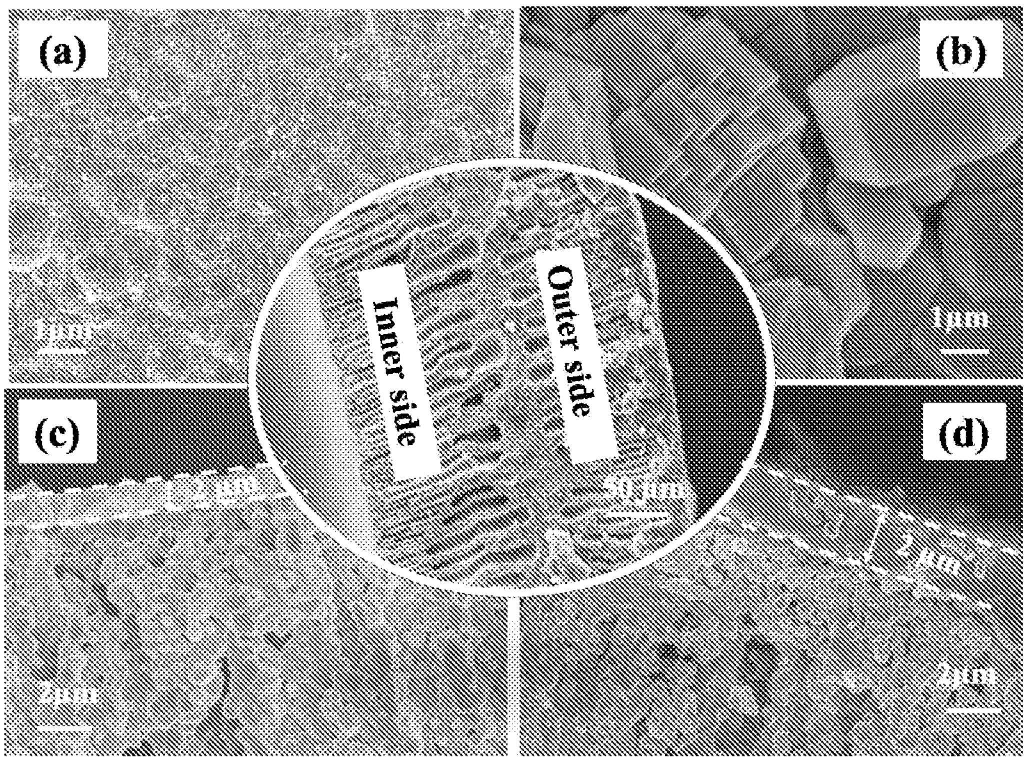
FIG. 4(*a*) shows SEM image of surface of Pd-based selective layer of membrane M3, FIG. 4(*b*) shows SEM image of surface of zeolite protective layer of membrane M3, FIG. 4(*c*) shows SEM image of cross-section of Pd-based selective layer of membrane M3, and FIG. 4(*d*) shows SEM image of cross-section of zeolite protective layer of membrane M3.

The SEM images of membranes M1, M2 and M3 are as shown in FIGS. 2 to 4, respectively. The SEM image of membrane M1 as shown in FIG. 2(*b*) showed that the zeolite protective layer formed on the outer circumferential surface of the alumina substrate was homogeneous and defect free. The Pd-based selective layer formed on the inner circumferential surface of the alumina substrate was also homogeneous and defect free and was about 1 μm thick, as seen in FIG. 2(*a*). The formation of LTA crystals was confirmed from the cubical and sharp edges of the zeolite protective layer surface. The crystal structure was also further conformed from the XRD analysis and matched.

FIGS. 3 and 4 also depict the deposition of the zeolite protective layer on the outer circumferential side and the Pd-based selective layer on the inner circumferential side of the hollow fiber substrates of membranes M2 and M3. In particular, formation of H-SOD protective layer in membrane M2 on the outer circumferential side of the hollow fibre substrate was evident from the spherical rice ball like structure in the SEM image in FIG. 3(*b*). Similarly, formation of the TS-1 zeolite protective layer was confirmed from the SEM analysis of membrane M3, which showed hexagonal crystals grown on the alumina substrate (see FIG. 4(*b*)).

The cross-sectional SEM images of the three membranes showed pore filled plating, and that the membranes had penetrated well inside the asymmetric hollow fibre pores. This increased the adherence properties of the zeolite protective layer and the Pd-based selective layers with the alumina support layer, enabling the membranes to become resistant to thermal cycling.

Figures 5, 6:
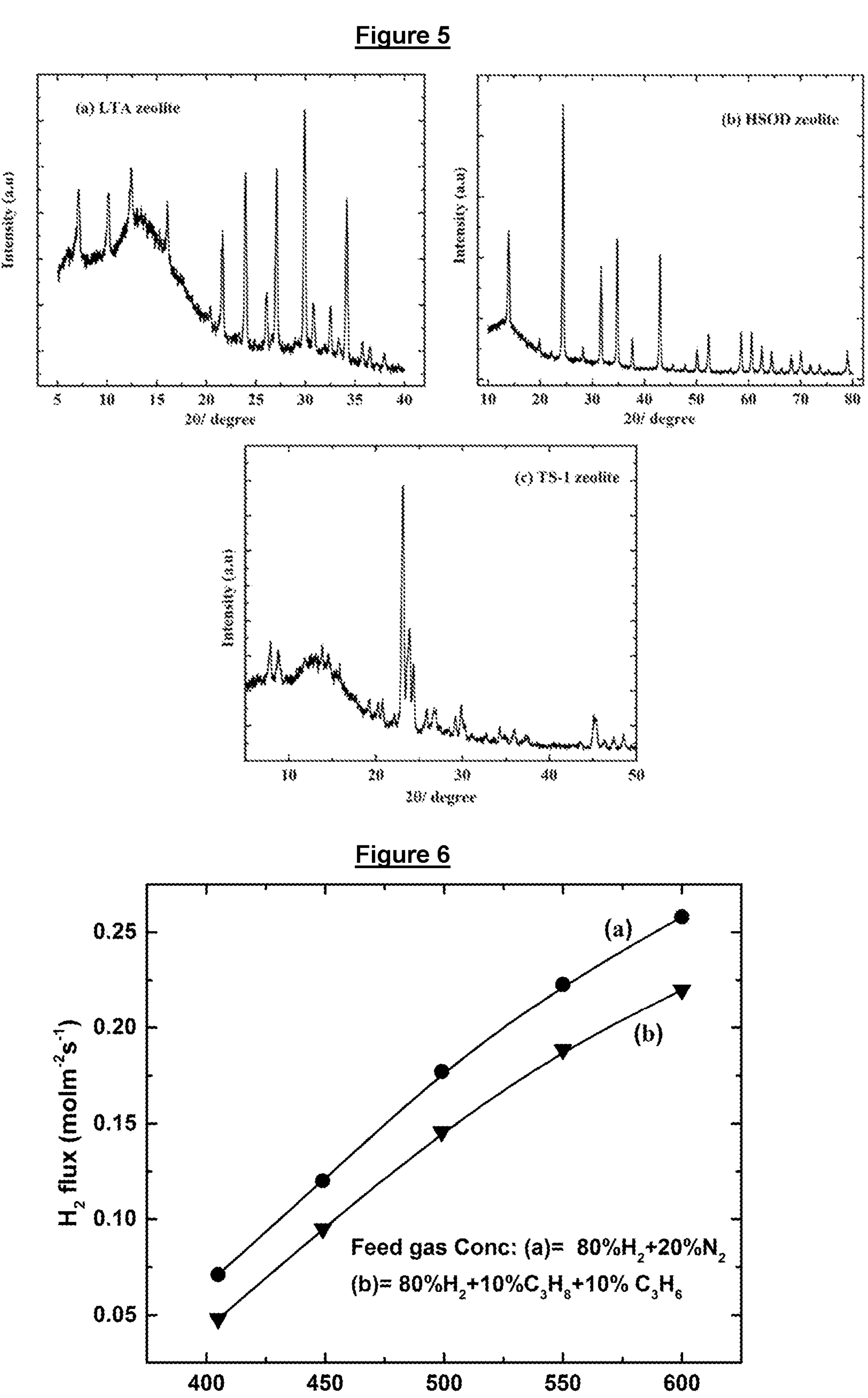
FIGS. 5(*a*), 5(*b*) and 5(*c*) show the XRD pattern of membranes M1, M2 and M3, respectively.
FIG. 6 shows effect of contaminants on hydrogen permeation in M1 membrane.

From FIGS. 5(*a*) to (*c*) showing the XRD patterns of the three respective zeolite protective layers of membranes M1, M2 and M3, it was further confirmed that crystalline zeolite protective layers had indeed formed on the outer circumferential surface of the alumina support layer.

Use of the Membranes

Membrane M1 was tested for hydrogen ($H_2$) permeation under different conditions and at temperatures up to 600° C., which is considered an ideal temperature for propane dehydrogenation and different reforming reactions such as $CO_2$ reforming of methane and steam reforming of toluene. The $H_2$ permeation for membrane M1 as a function of temperature under different gas feed conditions is provided in FIG. 6.

The hydrogen permeation flux increased with an increase in temperature and it showed exponential type of nature. The results showed that the diffusion of hydrogen through the zeolite protective layer followed a Knudsen diffusion mechanism. The hydrogen permeation flux was slightly lower than a 1 μm thick Pd membrane, which may be attributed to the mass transfer resistance due to the zeolite protective layer on the outer surface of the membrane.

The stability of membrane M1 in the presence of lighter hydrocarbons (10% $C_3H_6$+10% $C_3H_8$) was also evaluated at 600° C. for 72 hours. Hydrogen permeation flux as a function of time in the stream is shown in FIG. 7, which clearly depicts that the membrane performance is stable throughout the test period.

Figure 8:
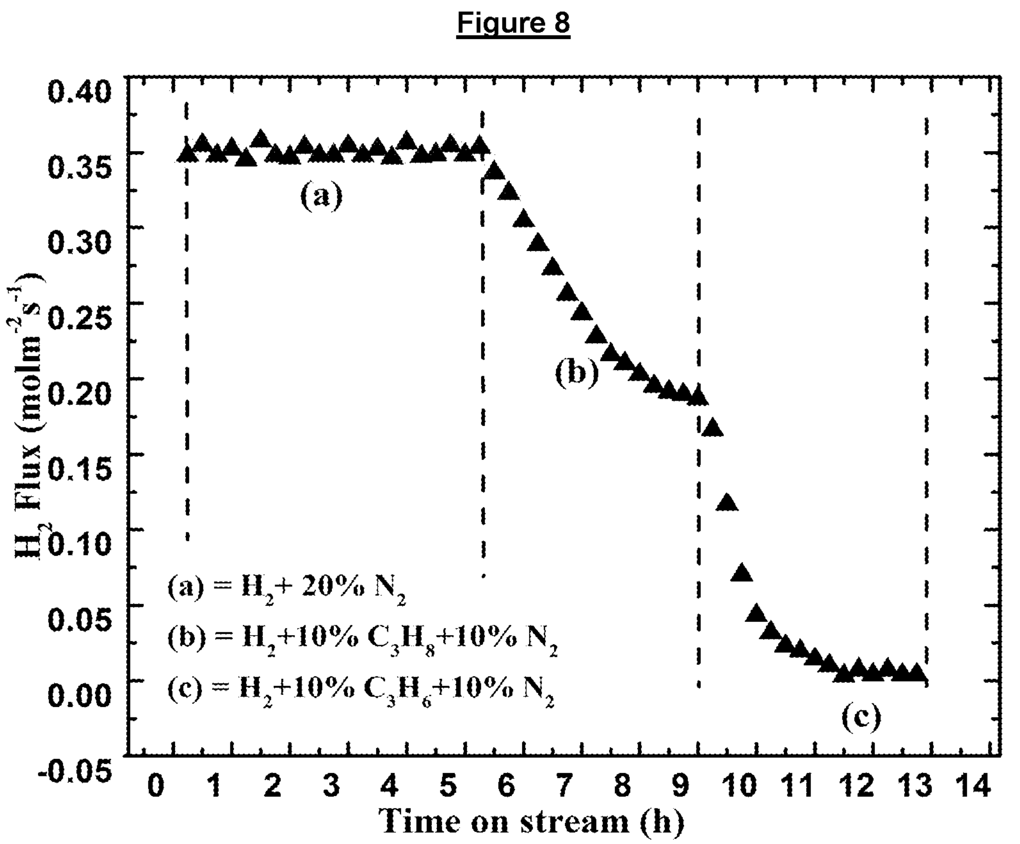
FIG. 8 shows the effect of contaminants on hydrogen permeation in membrane M4.

In order to compare the results with the conventional unprotected Pd membrane, membrane M4, the hydrogen permeation was carried out in membrane M4 in the presence of propane and propylene at 600° C. The hydrogen permeation flux as a function of time in stream at different feed gas compositions is shown in FIG. 8. The results indicate that the hydrogen flux of membrane M4 drastically decreased upon exposure to propylene. Membrane M4 supported on $Al_2O_3$ showed quick deactivation upon exposed to $C_3H_6$, and the deactivation was due to the strong interaction of the hydrocarbon species on the membrane. When the membrane was exposed to the hydrocarbon at 600° C., the hydrocarbon cracking caused severe coke deposition on the membrane surface. The coke formation on the surface drastically decreased the hydrogen flux. Further increase in time of exposure spoiled the membrane and the hydrogen selectivity decreased sharply.

Figure 7:
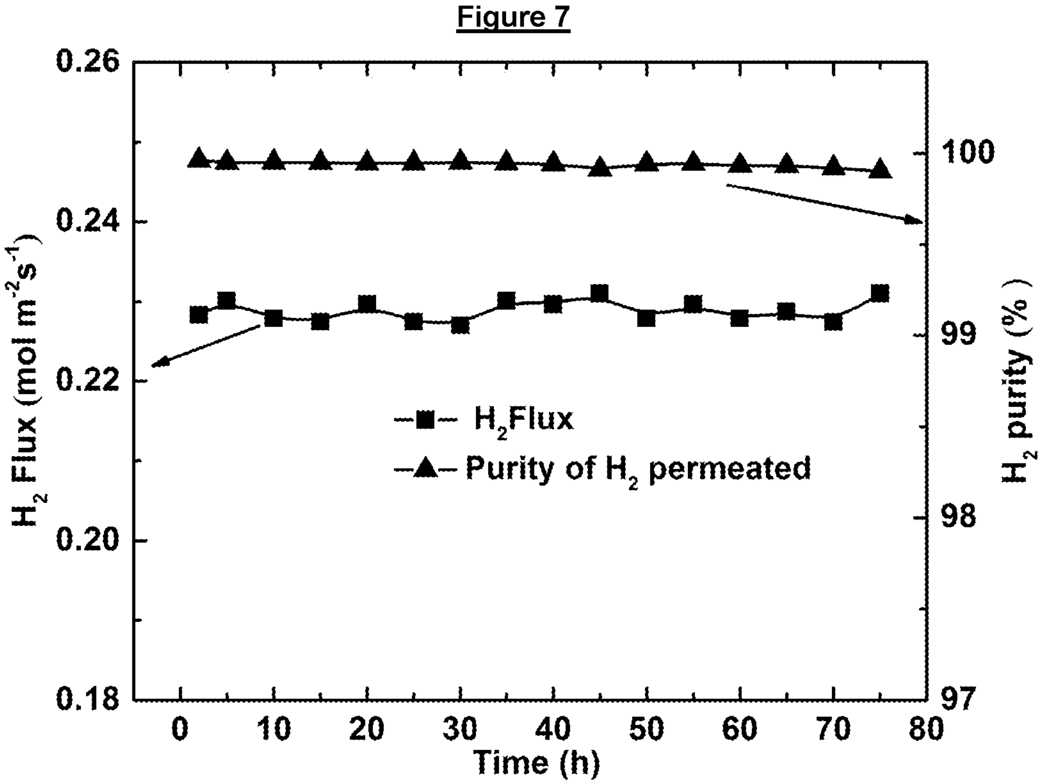
FIG. 7 shows stability test of membrane M1 for hydrogen purification using 10% $C_3H_8$ and $C_3H_6$ in hydrogen for 72 hours.

Comparing FIGS. 7 and 8, it can be observed that the unprotected Pd-membrane M4 is not stable even for 30 minutes in the presence of $C_3H_6$ and $C_3H_8$, whereas the membrane protected with zeolite protective layer, i.e. membrane M1, shows stable performance for 72 hours in presence of those contaminants. The zeolite protective layer acts as a protection barrier for the Pd-based selective layer of the membrane and selectively allows hydrogen to pass through it.

Figure 9:
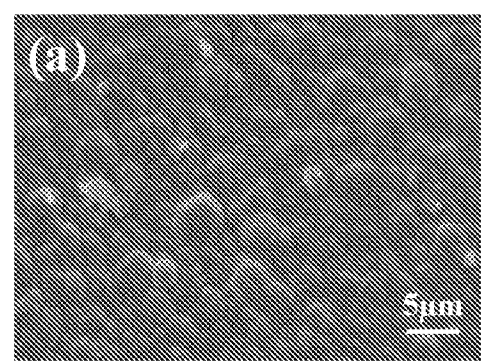
FIG. 9(*a*) shows the SEM image of membrane M1, FIG. 9(*b*) shows the SEM image of membrane M4 and FIG. 9(*c*) shows the SEM image of filamentous carbon deposit on the surface of membrane M4, after being exposed to $C_3H_8$ at 600° C.
Figure 9:
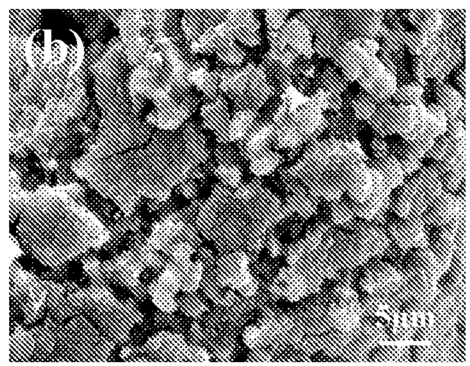
Figure 9:
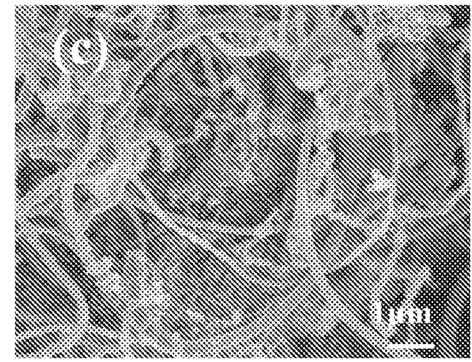

FIG. 9 shows the SEM images of spent membranes M1 (FIG. 9(*a*)) and M4 (FIG. 9(*b*)) after the permeation test, which clearly shows growth of filamentous carbon fibres (FIG. 9(*c*)) on the surface of the membrane M4. Due to vigorous carbon formation, membrane M4 was cracked and spoiled.

Figure 10:
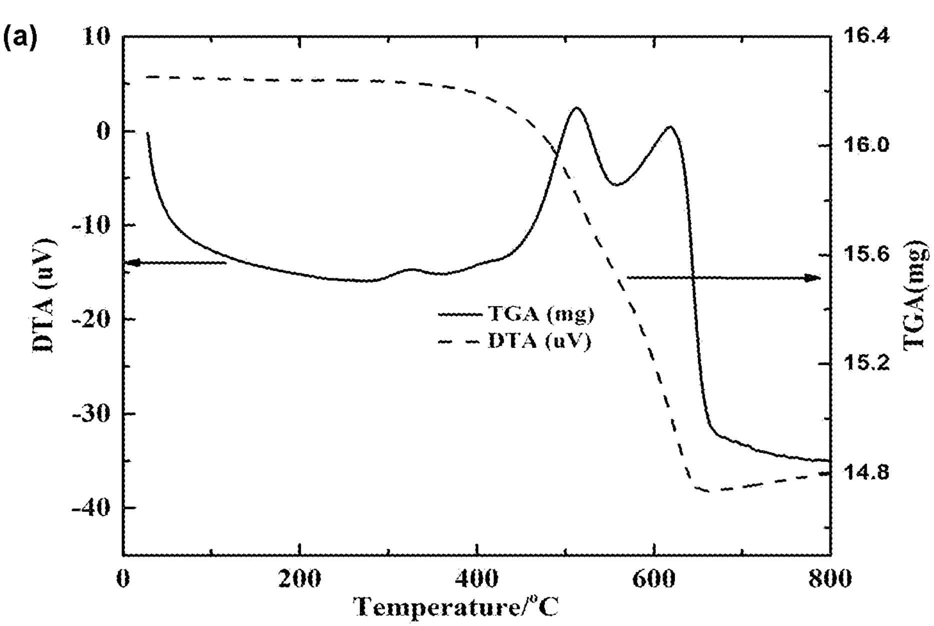
FIG. 10(*a*) shows TGA of spent membrane M4 and FIG. 10(*b*) shows the TGA of spent membrane M1 after exposure to $C_3H_8$ and $C_3H_6$.
Figure 10:
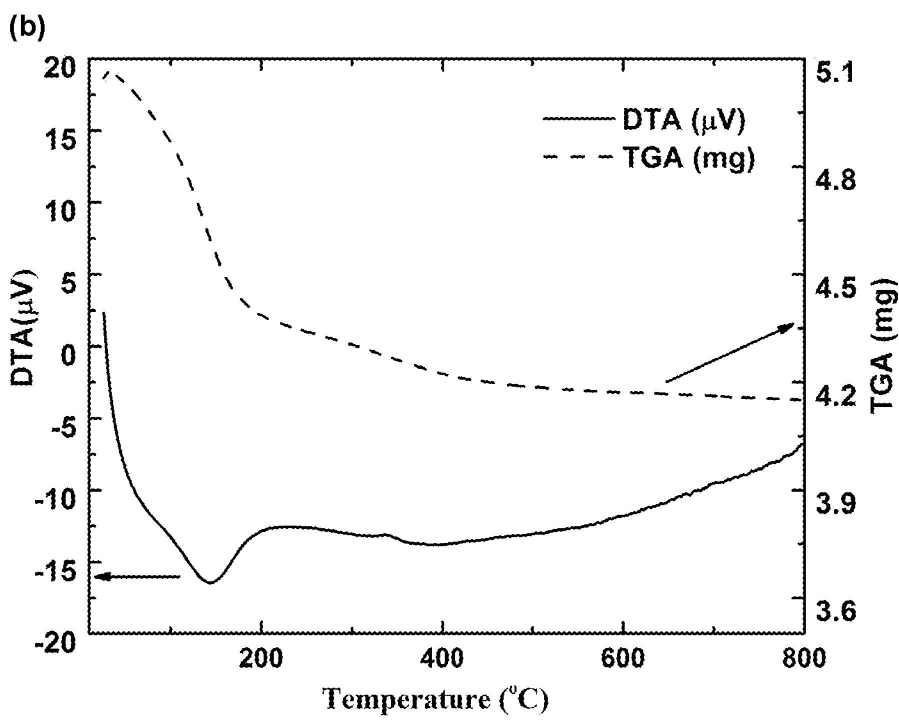

The spent membrane was further characterized by TGA to investigate the coke deposition on the membrane surface. The TGA of membrane M4 and membrane M1 are given in FIGS. 10(*a*) and (*b*), respectively. It is evident from the figure that after exposure to 10% $C_3H_6$+10% $C_3H_8$ for 72 hours, there was minimal coke deposition on Pd surface and no deformation or cracks was found on the membrane M1. The small amount of carbon deposited on the membrane M1 may be due to thermal cracking of $C_3H_8$ and $C_3H_6$. It can therefore be deduced from that there was negligible coke formation on the membrane surface of membrane M1 since it comprised a zeolite protective layer.

Figure 11:
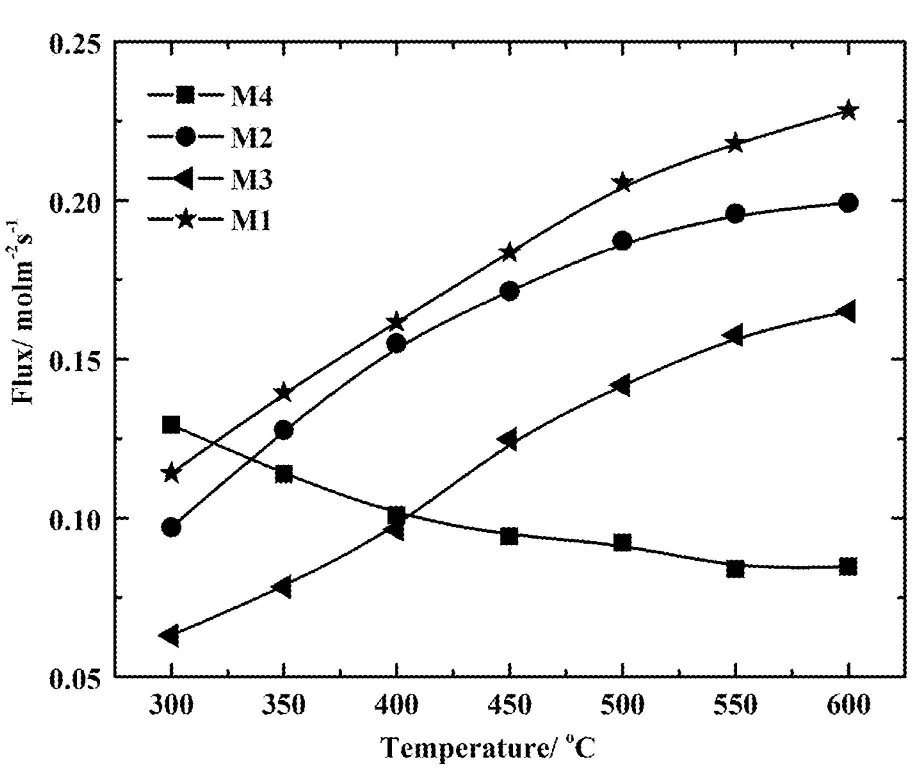
FIG. 11 shows hydrogen separation performance of the membranes M1, M2 and M3 according to embodiments of the present invention as compared to membrane M4 in presence of 10% $C_3H_6$ and 10% $C_3H_8$.

The hydrogen separation performance of each of membranes M1, M2, M3 and M4 was measured as a function of temperature. The results obtained are shown in FIG. 11. The results show that the hydrogen flux of the unprotected membrane M4 decreased as the temperature increased, but membranes M1, M2 and M3 which comprised the zeolite protective layer, showed improved performance in the presence of hydrocarbons. The hydrogen flux of the three triple layered membranes M1, M2 and M3 increased with temperature, and showed an exponential behaviour with temperature. The hydrogen flux through the membranes M1 and M2 are nearly the same, but the hydrogen flux for the membrane M3 is less than membranes M1 and M2.

Comparative Results

Figure 12:
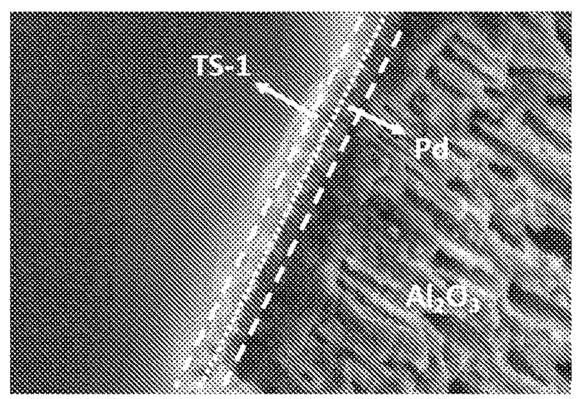
FIG. 12 shows the SEM image of a membrane M5 according to one embodiment of the present invention.
Figure 12:
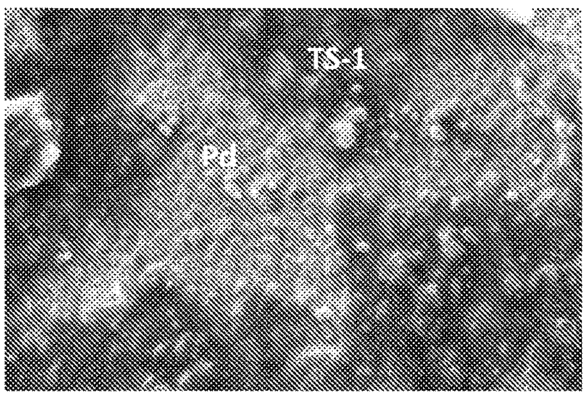

There are prior art membranes in which a zeolite layer is provided directed on the Pd-based selective layer as a protective layer. Therefore, for a better basis of comparison of the membranes of the present invention with the prior art zeolite protected membrane, a membrane M5 was formed in which a Pd-based selective layer was formed on the outer circumferential side of the hollow fiber substrate and TS-1 zeolite protective layer was coated directly on the Pd-based selective layer by secondary growth method. The SEM image of the membrane M5 is shown in FIG. 12, which showed non-uniform growth of the zeolite protective layer on the Pd-based selective layer. The growing of zeolite layer over metallic Pd layer may often be non-uniform and may lack adherence property due to mismatched matrix of the metallic layer and the ceramic substrate.

Figure 13:
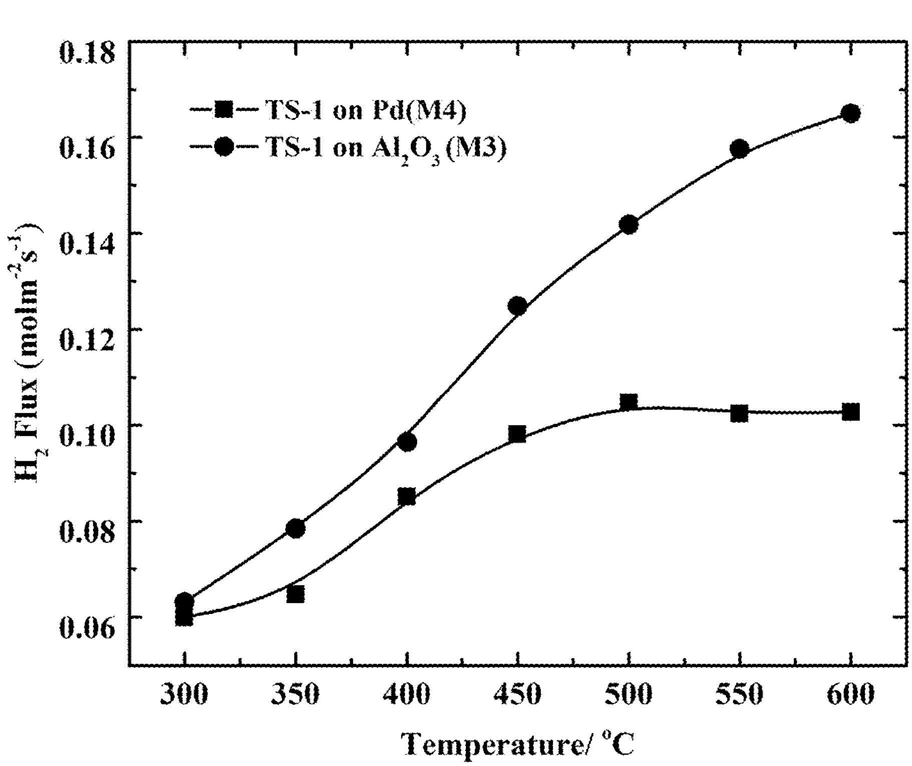
FIG. 13 shows comparison of performance of membranes M3 and M5 in presence of $C_3H_6$ and $C_3H_8$.

The membrane M5 was tested for hydrogen separation in the presence of hydrocarbons and the result was compared to the membrane M3. The results are shown in FIG. 13. It can be seen that the hydrogen permeation decreased in presence of the hydrocarbons for membrane M5, and this may be due to the non-uniform zeolite protection layer formed over the Pd selective layer that allowed propane/propylene to come in contact with the membrane. The adsorption of the hydrocarbon compounds on the membrane surface resulted in decreased hydrogen flux. Additionally, at temperatures above 500° C., diffusion of Ti from the zeolite layer into the Pd selective layer may have occurred and resulted in a poor hydrogen permeation.

Thus, it can be seen that the membrane of the present invention has superior performance compared to zeolite protected membranes known in the art.

Example 2

Applicability of Membrane in Catalytic Activity of Propane Dehydrogenation Reaction The applicability of membrane M1 was evaluated for propane dehydrogenation was using a catalytic membrane reactor. 7.5% $Cr/Al_2O_3$ catalyst was used for propane dehydrogenation reaction at 600° C. using fixed bed reactor (FBR) and catalytic membrane reactor (CMR).

Figure 14:
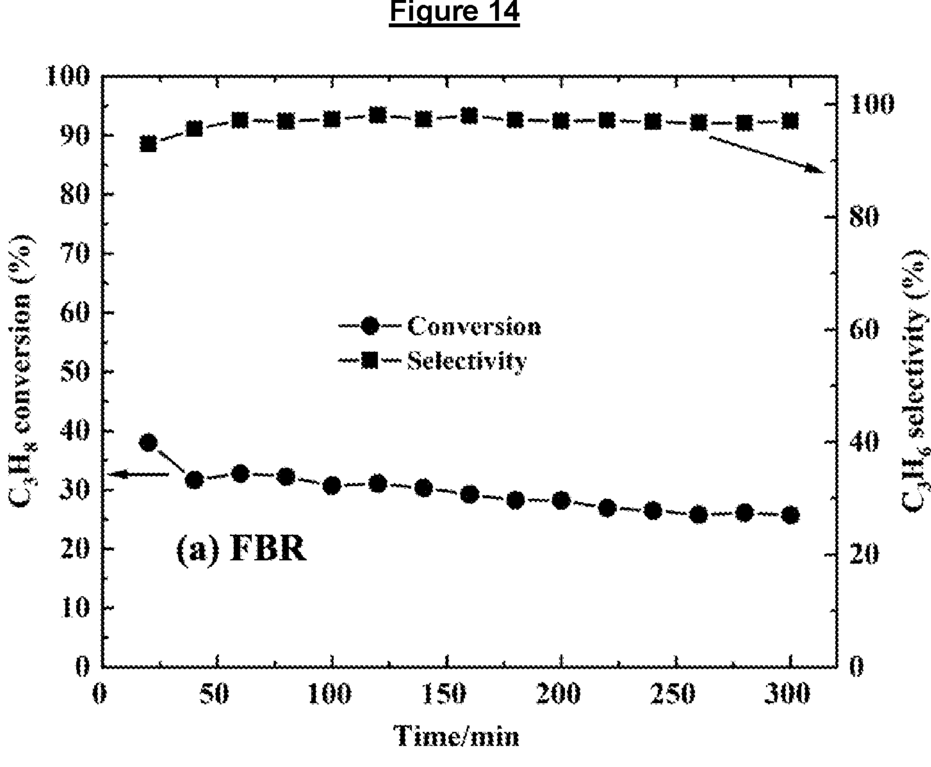
FIG. 14(*a*) shows propane dehydrogenation in a FBR reactor and FIG. 14(*b*) shows a triple layer CMR using 7% $Cr/Al_2O_3$ catalyst (under reaction condition: 200 mg catalyst, 10% $C_3H_8$ in He and 600° C.)
Figure 14:
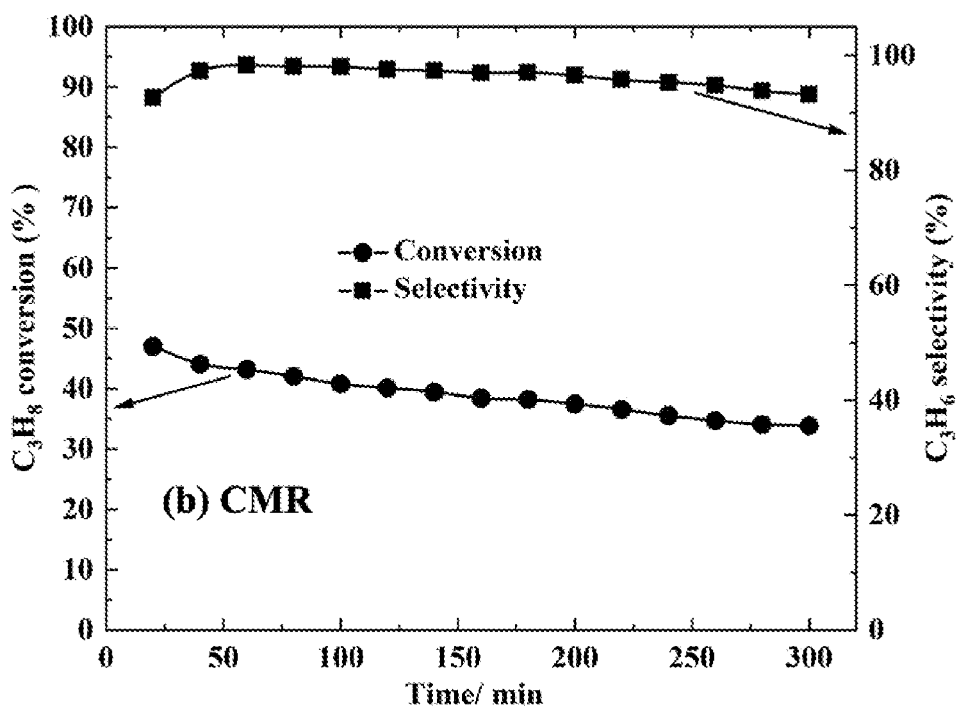

The formation of catalyst was analyzed by XRD and transmission electron microscopy. It could be concluded from the XRD of the catalyst (not shown) that the diffraction pattern of the fresh catalyst showed excellent dispersion of $CrO_x$ in the mesoporous structure. No significant peak corresponding to $CrO_x$ was detected in the diffraction pattern. The XRD pattern further indicated the poor crystallinity of the sample. The TEM images of the fresh catalyst depicted the incorporation of $CrO_x$ species inside the hexagonal mesoporous structure. The EDS mapping of the catalyst also confirmed the well dispersion of $CrO_x$ in the catalyst. Thus, the catalyst had excellent metal support interaction, which is a requisite parameter for a stable and higher catalytic activity. The activity of the catalyst was evaluated and the results were compared as shown in FIG. 14.

The activity in the CMR was found to be higher than the FBR, and around 15% increment in the activity was achieved after integrating in the membrane reactor. The performance of the catalyst was relatively stable in the membrane reactor. However, there was a slow decrease in the catalyst activity in both the cases, which may be ascribed to the coke deposition on the catalyst. The coke deposition was mainly due to thermal C—C bond cleavage rather than the selective C—H bond breaking (as can be seen in Equations 1 and 2). These reactions given in equation, describe the possible pathways for formation of other impurities such as $CH_4$ and $C_2H_6$ along with $C_3H_6$. The formation of these products decreased the selectivity of propane and caused coke deposition on catalyst, thereby decreasing the activity with time. The coke formation in the spent catalyst was evaluated by TGA analysis (not shown) which showed negligible coke formation on the catalyst.

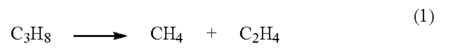

(1)

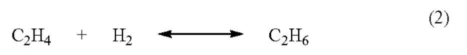

(2)

It can be seen that the instantaneous removal of hydrogen from propane dehydrogenation reaction using a $H_2$ permeable membrane increased the conversion compared to conversion in a fixed bed reactor. Thus, it can be concluded that the zeolite protective layer in membrane M1 plays a vital role in protecting the Pd-based selective layer of the membrane from coke formation (due to reaction with the hydrocarbons). The membrane is stable enough at high temperature and in the presence of contaminating gases. Further, the membrane reactor is successfully applied for propane dehydrogenation reaction. All these results confirm that the membrane of the present invention is suitable for different dehydrogenation and hydrogenation reactions of several hydrocarbons.

Example 3

Applicability of Membrane in a Membrane Reactor for Coupling Propane Dehydrogenation and Carbon Dioxide ($CO_2$) Methanation Reactions A tubular membrane comprising a zeolite protective layer and a Pd-based selective layer on either surface of a support layer was formed in the manner similar to that described in Example 1 with reference to membrane M1. In particular, the zeolite protective layer comprised LTA and the selective layer comprised palladium. The zeolite protective layer was formed on the outer side while the Pd selective layer was formed on the inner side of a 12 mm outer diameter and 8 mm inner diameter tubular alumina support.

Figures 15, 16:
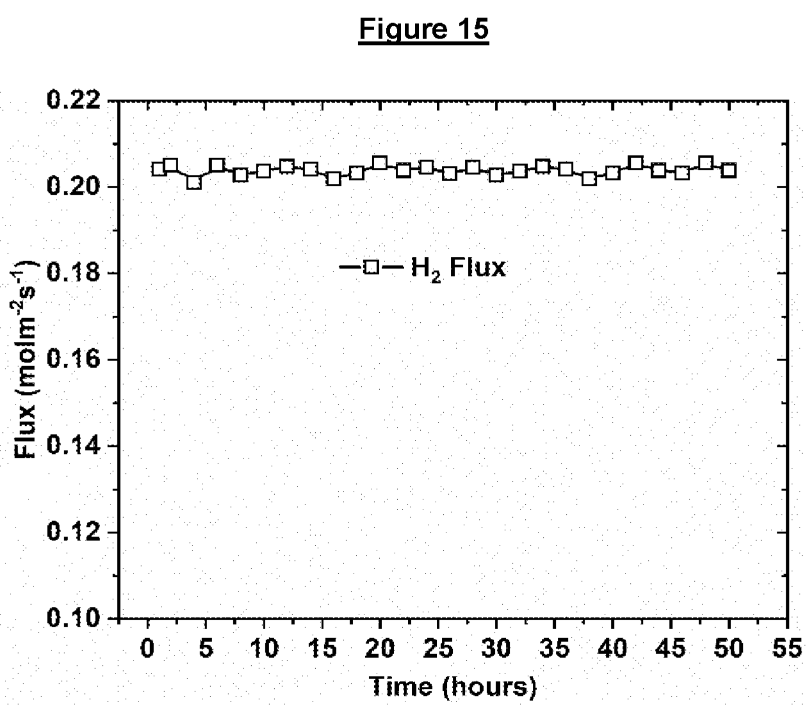
FIG. 15 shows hydrogen permeation in a tubular membrane according to one embodiment of the present invention (Reaction conditions: gas composition=80% $H_2$, 10% $C_3H_6$ and 10% $C_3H_8$, T=600° C., P=1 bar pressure, $N_2$ sweep gas)
FIG. 16 shows a schematic representation of coupling endothermic PDH reaction with exothermic $CO_2$ methanation reaction in a catalytic membrane reactor comprising a membrane according to one embodiment of the present invention.

The performance of the membrane was evaluated by measuring the hydrogen flux through the membrane in the presence of contaminating gases like $C_3H_8$ and $C_3H_6$, and the results showed a stable performance for 50 hours (see FIG. 15). This proves the robustness of the membrane for hydrogen separation from the gas mixture containing hydrocarbon impurities.

The hydrogen flux in a membrane reactor depends on the hydrogen concentration difference across the membrane. It is well known that when a reactive gas is used in the sweep gas side that can consume hydrogen, this enhances the performance of membrane by creating a higher concentration gradient. To evaluate the performance, a bi-functional membrane reactor was constructed by packing two different catalysts on either side of the membrane for conducting propane dehydrogenation (PDH) and $CO_2$ methanation reactions. A schematic representation of coupling the two reactions in a single membrane reactor is shown in FIG. 16.

Figure 17:
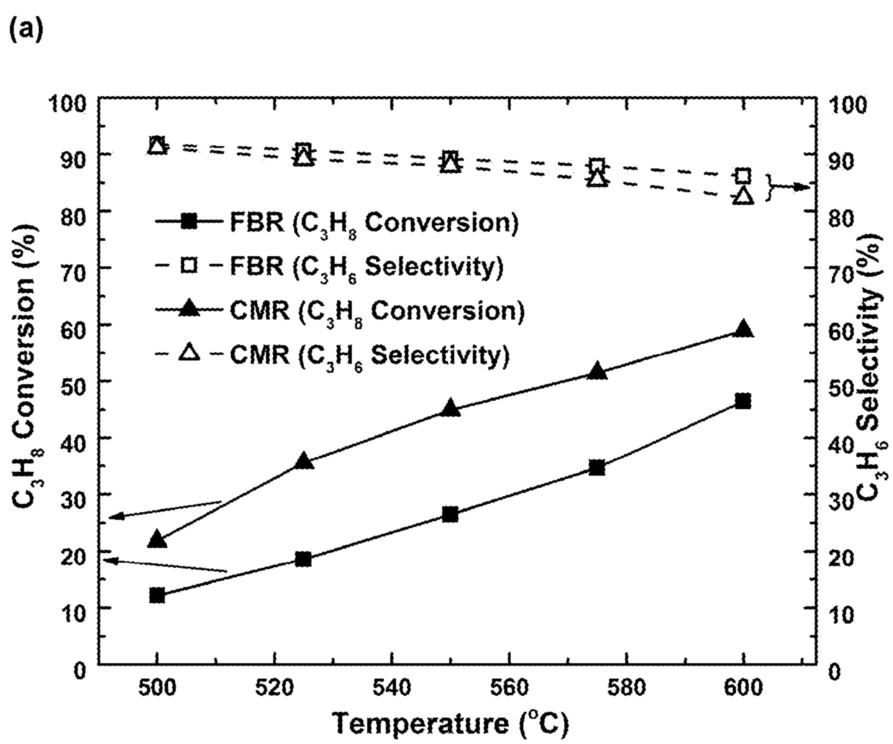
FIG. 17(*a*) shows the performance of a bi-functional membrane reactor during PDH reaction, and FIG. 17(*b*) shows the performance of the reactor during $CO_2$ methanation reaction.
Figure 17:
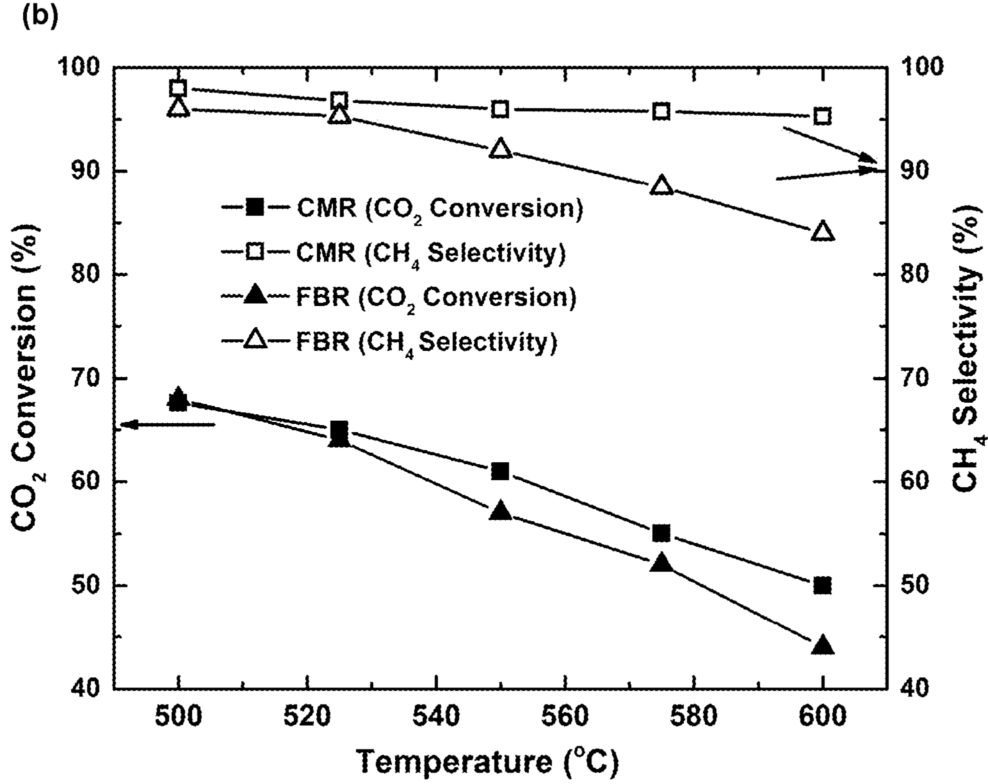

Pt—Sn based catalyst was packed on the outer side for PDH reaction and 10% Ni—$CeZrO_x$ catalyst was packed in the inner side of the tubular membrane for $CO_2$ methanation reaction. Around 5 g Pt—Sn/$Al_2O_3$ catalyst was used for PDH reaction, whereas 3 g of 10% Ni—$CeZrO_x$ catalyst was packed inside for $CO_2$ methanation reaction. The performance of the dual functional membrane reactor is shown in FIG. 17.

The results clearly depict that upon coupling the reaction in a membrane reactor the activity of PDH reaction was enhanced. The degree of enhancement was higher at lower temperatures compared to the high temperature. The results can be ascribed to the higher amount of hydrogen consumption at lower temperatures.

The exothermic nature of the $CO_2$ methanation reaction favoured higher $CO_2$ conversion and hydrogen consumption at low temperatures. This resulted in a higher hydrogen concentration gradient across the membrane at low temperatures than the high temperature. Similarly, the $CO_2$ methanation reaction in the membrane reactor was also higher at high temperature. This was due to the removal of hotspots from the exothermic $CO_2$ methanation reaction by coupling with endothermic PDH reaction.

Further, the $CH_4$ selectivity in $CO_2$ methanation reaction was also enhanced after coupling in a membrane reactor compared to fixed bed reactor (FBR). The increased selectivity was due to the hydrogen spill over on the membrane surface. Thus, it can be seen that the membrane of the present invention is suitable for use in reactors in which two reactions are coupled in a single membrane reactor.

Example 4

Applicability of Membrane in a Membrane Reactor for Methane Decomposition for High Pure Hydrogen Production A membrane was formed similar to membrane M1 as described in Example 1 for use in a reactor for methane decomposition.

Catalytic dehydrogenation/decomposition of methane (CDM) is very important for the production of hydrogen from cheaper and abundant sources like natural gas. The decomposition follows the following reaction:

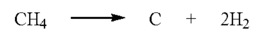

(ΔH at 298K = 37.4 kJ $mol^{-1}$ $H_2$)

Figure 18:
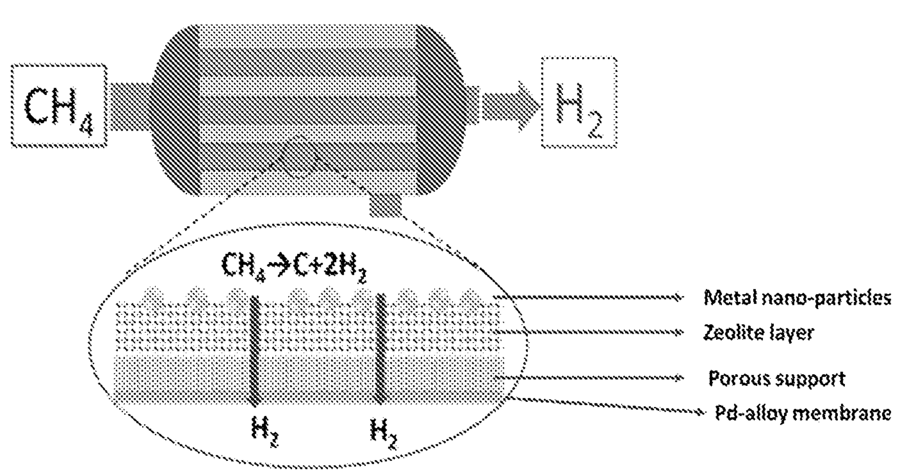
FIG. 18 shows a schematic representation of a reactor comprising a membrane comprising a modified zeolite protective layer (i.e. catalyst layer and zeolite protective layer) according to one embodiment of the present invention.

In this example, the applicability of the membrane for hydrogen production from methane pyrolysis reaction is studied. The outer zeolite protective layer was functionalized by active metals by forming phyllosilicate structure upon urea hydrolysis treatment. The modified layer acts as active catalytic centres for $CH_4$ pyrolysis reaction as shown in FIG. 18.

The zeolite protective layer was coated on the outer surface of the alumina substrate and Pd-based selective layer was formed on the inner surface. Additionally, an active Ni-silicate layer was grown on the surface of the zeolite protective layer for $CH_4$ pyrolysis reaction. The modified zeolite protective layer acted as both catalyst for the $CH_4$ pyrolysis reaction and as a protective layer for the Pd-based selective layer of the membrane. The catalytic membrane reactor provides benefits in multiple ways such as: a) catalyse the pyrolysis reaction, b) increase the hydrogen flux through the membrane by inhibiting the coke formation on the Pd-based selective layer and c) increase the yield of reaction, by selectively removing $H_2$.

Figure 19:
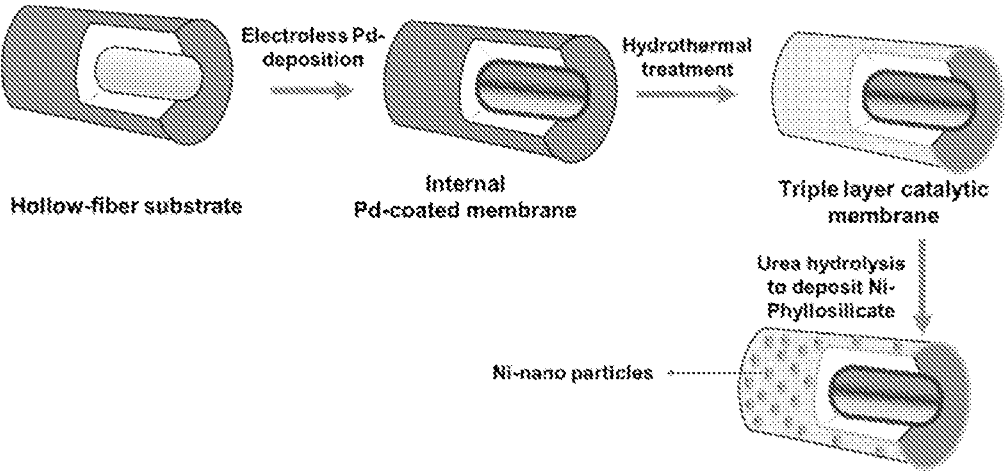
FIG. 19 shows a schematic representation of a process of forming a membrane comprising a modified zeolite protective layer according to one embodiment of the present invention.

For the catalytic methane decomposition reaction, a part of the zeolite protective layer was modified with a catalyst layer as shown in FIG. 19.

The catalyst layer was grown on the membrane by urea hydrolysis method using Nickel nitrate hexa-hydrate $(NiNO_3)6H_2O$ solution. The Ni-precursor was dissolved in deionized water followed by addition of urea at a molar ratio of urea to Ni equals 8. Hydrothermal synthesis was conducted at 160° C. for 8 hours using membrane M1 to grow the Ni-phyllosilicate over the zeolite protective layer. The Ni-phyllosilicate structure was formed due to the interaction of —Si—O— bond present in the zeolite matrix with Ni. The membrane prepared by this method was characterized by SEM analysis. The surface morphology of the membrane before and after modification is shown in FIG. 20.

Figure 20:
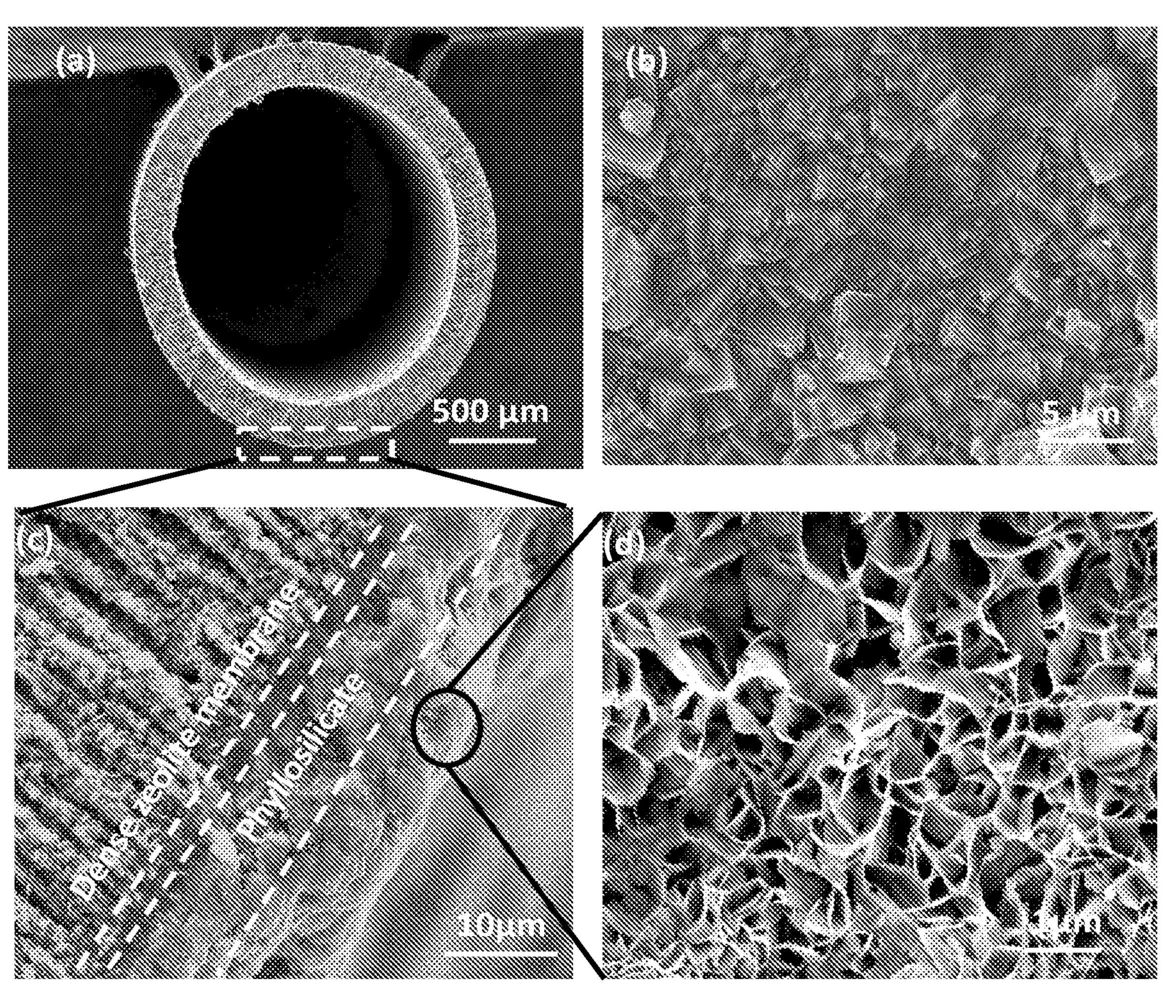
FIG. 20(*a*) shows the SEM image of a membrane according to one embodiment of the present invention, FIG. 20(*b*) shows the SEM image of an unmodified zeolite protective layer of the membrane, FIG. 20(*c*) shows the SEM image of an modified zeolite protective layer of the membrane, and FIG. 20(*d*) shows the cross section of the outer layer of the membrane following modification of the zeolite protective layer.

The SEM image of the outer zeolite surface showed formation of sharper LTA zeolite (see FIG. 20(*b*)). However, flower like layer structure was observed after the zeolite protective layer was modified by urea hydrolysis method indicating the formation of Ni-Phyllosilicate structure (see FIG. 20(*c*)). The cross-sectional view of the outer layer confirmed the reduction of effective thickness of outer dense layer and formation of flower like layered structure on the top of a thin dense zeolite layer upon modification (FIG. 20(*d*)).

Figure 21:
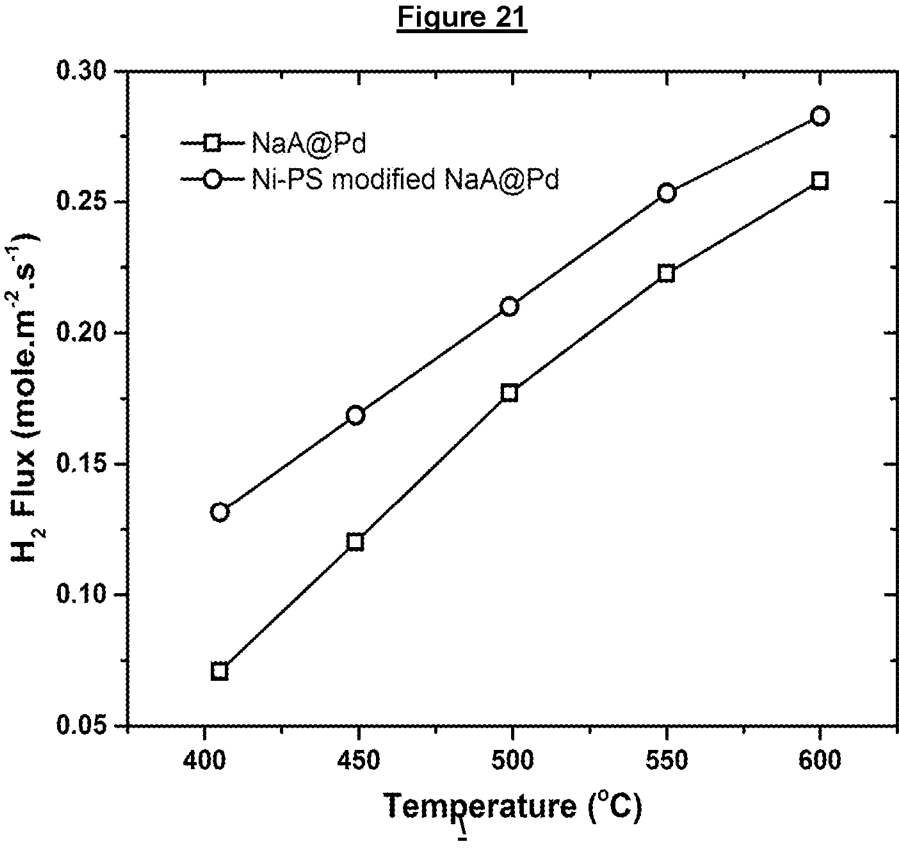
FIG. 21 shows the hydrogen flux performance of two different membranes according to the present invention.

The performance of the membrane for hydrogen separation was evaluated and is shown in FIG. 21. It was observed that the hydrogen flux of the membrane was higher than that of membrane M1. The difference in hydrogen flux was more prominent at lower temperatures compared to higher temperatures. The results can be ascribed to the catalytic nature of the Ni-particles on the zeolite layer for chemisorption of hydrogen. The presence of Ni-particles increased the hydrogen solubility of the zeolite layer, which contributed towards higher hydrogen flux of the Ni—PS modified zeolite layer. Further, the decreased effective thickness of the dense zeolite layer also decreased the diffusion resistance of gas molecules through the zeolite membrane. The hydrogen flux through the membrane was therefore enhanced after modification.

Figure 22:
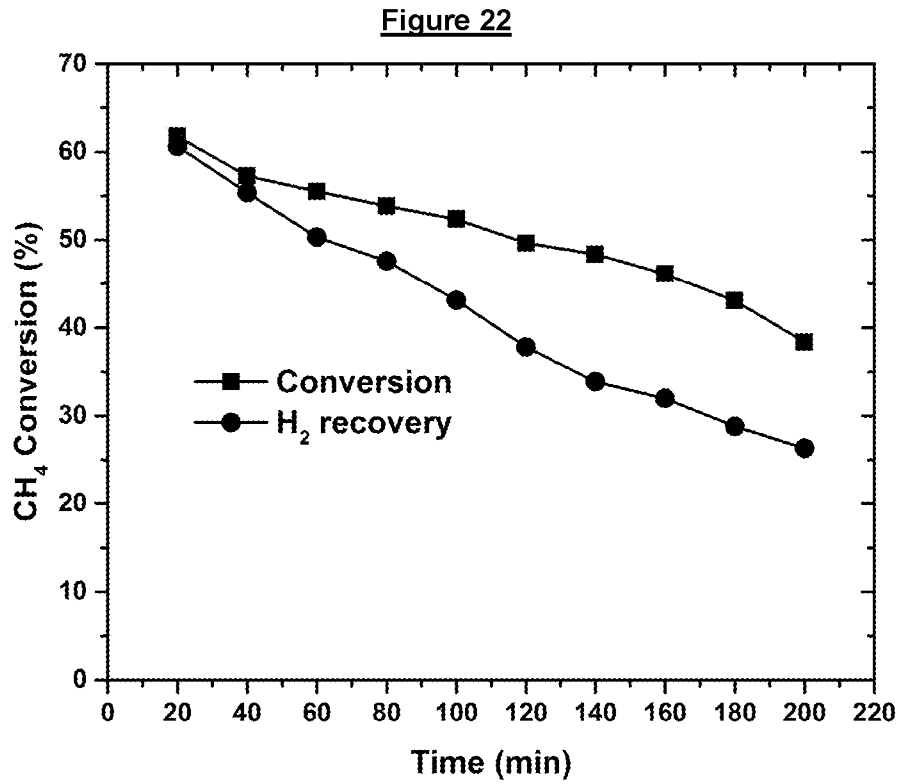
FIG. 22 shows $CH_4$ decomposition reaction in a Ni—PS modified membrane reactor.

The catalytic membrane reactor was tested for $CH_4$ pyrolysis reaction at 600° C. and the results are shown in FIG. 22. It is evident that the membrane showed excellent catalytic property, and around 62% of $CH_4$ was converted to $H_2$. However, the decomposition of $CH_4$ resulted in deposition of coke on the active Ni-sites. Therefore, there was a sharp decrease in the initial activity and with progress of reaction the activity dropped down slowly. Moreover, high purity $H_2$ (≥99.9% purity) was recovered from the reaction in the permeate side. The membrane was very effective in recovering the produced $H_2$. However, due to the decrease in catalytic activity the partial pressure difference across the membrane decreased which, in turn decreased the hydrogen recovery in the permeated side with the progress of reaction.

Whilst the foregoing description has described exemplary embodiments, it will be understood by those skilled in the technology concerned that many variations may be made without departing from the present invention.

The invention claimed is:

1. A membrane comprising:

a porous support layer having a first surface and a second surface;

a palladium (Pd)-based selective layer on a first surface of the support layer; and a zeolite protective layer on a second surface of the support layer, wherein the support layer is between the Pd-based selective layer and the zeolite protective layer, and wherein the support layer is a hollow fibre support layer having an inner circumferential surface and an outer circumferential surface and wherein the palladium (Pd)-based selective layer is provided on the inner circumferential surface and the zeolite protective layer is provided on the outer circumferential surface.

2. The membrane according to claim 1, wherein the zeolite protective layer comprises an aluminosilicate zeolite.

3. The membrane according to claim 1, wherein the zeolite protective layer has a thickness of 0.5-3.0 μm.

4. The membrane according to claim 1, wherein the support layer comprises a ceramic material.

5. The membrane according to claim 1, wherein the support layer has pores each having an average pore size of 50-200 nm.

6. The membrane according to claim 1, wherein the hollow fibre support layer has an outer diameter of 800-4000 μm.

7. The membrane according to claim 1, wherein the hollow fibre support layer has an inner diameter of 500-2000 μm.

8. The membrane according to claim 1, wherein the Pd-based selective layer comprises palladium or a palladium alloy.

9. The membrane according to claim 1, wherein the Pd-based selective layer has a thickness of 0.5-5.0 μm.

10. The membrane according to claim 1, further comprising a catalyst layer on the zeolite protective layer.

11. The membrane according to claim 10, wherein the catalyst layer comprises metal nanoparticles.

12. The membrane according to claim 11, wherein the metal nanoparticles comprise Ni-based nanoparticles.

* * * * *